J. C. LINCOLN.
APPARATUS FOR CURING MEAT.
APPLICATION FILED NOV. 27, 1908.
1,037,941.
Patented Sept. 10, 1912.
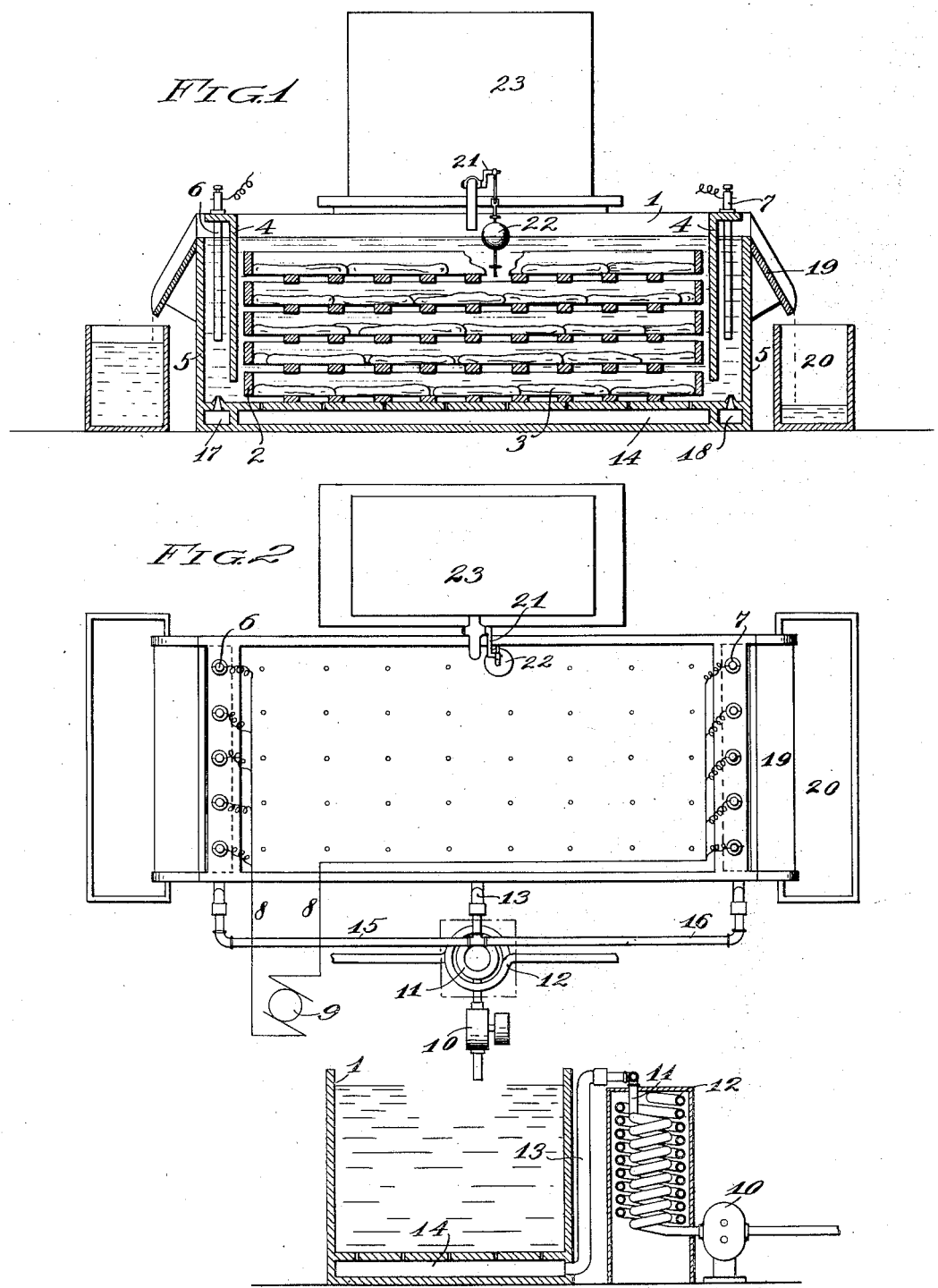

UNITED STATES PATENT OFFICE.

JOHN C. LINCOLN, OF EAST CLEVELAND, OHIO, ASSIGNOR TO THE ELECTRIC MEAT CURING COMPANY, OF CLEVELAND, OHIO, A CORPORATION OF MAINE.

APPARATUS FOR CURING MEAT.

1,037,941.      Specification of Letters Patent.      Patented Sept. 10, 1912.

Application filed November 27, 1908. Serial No. 464,767.

To all whom it may concern:

Be it known that I, JOHN C. LINCOLN, a citizen of the United States, residing at East Cleveland, in the county of Cuyahoga and State of Ohio, have invented a certain new and useful Improvement in Apparatus for Curing Meat, of which the following is a full, clear, and exact description, reference being had to the accompanying drawings.

This invention relates to an apparatus for curing meat with the aid of an electric current,—the object being to provide an apparatus which will be very efficient in carrying out a continuous curing process. The electric current passing through the meat and brine greatly reduces the time required for curing. The current, however, tends to heat the meat and brine and the disintegrating electrodes and the products of electrolysis tend to contaminate it. The present invention provides very simple and effective means for keeping the brine and meat cool and for preventing such contamination. This same means produces the further desirable result of keeping some movement in the brine, causing it to act more effectively on the various pieces of meat.

I accomplish all the above results by blasts of air through the brine. These blasts agitate the brine and, by being previously cooled, keep the brine at the proper temperature, and moreover, the blasts are so directed as to cause a flow of the liquid surrounding the electrodes in a direction away from the curing portion of the tank so as to prevent any commingling of the brine immediately around the meat with any undesirable matter formed at the electrodes.

The invention is hereinafter more fully explained, and its essential characteristics set out in the claims.

The drawings show an approved form of my apparatus.

Figure 1 is a sectional side elevation thereof; Fig. 2 is a plan; and Fig. 3 is a transverse vertical section.

As shown in the drawings, 1 represents a tank formed to contain suitable trays 2 in which are placed pieces of meat 3. The end portions of the tank are partially separated from the intermediate portions by partitions 4, which partitions, however, do not extend to the bottom of the tank. Within the compartments formed between the partitions 4 and the respective ends 5 of the tank are electrodes 6 and 7. Electrodes 6 are all coupled in multiple, and those 7 in multiple, and the two sets constitute terminals of a circuit 8 from a suitable source of current 9. This current passes from one set of electrodes to the other through the adjacent brine beneath the partitions 4, and through the brine and meat.

To perform the triple function of agitating the brine, cooling it, and preventing the brine around the electrodes from commingling with the rest of the brine, I provide a system of blasts of cold air.

10 represents a pump or rotary blower for compressing the air.

11 is a coil pipe through which the air flows and in which it is cooled by proximity with a coil 12 of a suitable cooling system, containing compressed ammonia or other cooling medium. From the coil 11, the air conduit is shown as branching into three pipes, one 13 leading to a chamber 14 in the bottom of the tank, and the others 15 and 16 leading to chambers 17 and 18 respectively beneath the compartments which are occupied by the electrodes 6 and 7.

Each of the chambers 14, 17 and 18 communicates with the space above it by suitable openings or nozzles. The area of the nozzles in the chamber 14 are such that the flow of air pressure is much reduced and only such flow is maintained as will give a gentle agitation to the brine and properly cool it. The air blasts from the chambers 17 and 18, however, are of more force and serve to give a decided upward current in the compartments above them, causing the brine therein to continuously overflow the tops of the end walls 5. This continuous overflow tends to lower the level of the brine within the tank, which is compensated for by additional brine from a tank 23,—the valve 21 of which is controlled by suitable means, as for example, a glass float 22 on the brine.

When the brine passes over the ends of the tank, it runs down the draining boards 19 and runs into the sewer. The overflow of the brine need not be very great and it is a considerable time before any material amount has been removed. At the same time, enough is removed to make a continuous upward current around the electrodes, preventing any products of electrolysis or disintegrated electrodes from commingling with the brine in the tank proper. The blasts of air through the electrode compartments cause the brine therein to bubble, and the amount which passes over is in the form of foam and incapable of carrying electric current. The flow of current from one set of electrodes to the other through the brine and meat is not diminished by the overflow, nor is there any chance of a short circuit by reason of it.

It will be seen that I have, by the above means, provided a very simple apparatus for carrying on the curing process. The products of electrolysis and the disintegrating electrodes are continuously and automatically removed, the brine is kept at the proper level and at the proper temperature. It is not necessary to stop the operation either to cool the brine or to regulate its level in the tank or to remove any contamination. The continuous agitation of the brine by the pasing air insures all parts of the meat being evenly acted upon.

By using an alternating current, or a direct current periodically reversed, as set out in my co-pending applications, the formation of chlorin or alkali salts in any undesirable amount at the electrode may be prevented. If a direct current is used continuously without reversing, the chlorin and sodium hydrate, etc., in solution, may be taken care of by the outwardly flowing liquid, while a suitable hood and fan may take care of the escaping chlorin gas. The dynamo shown at 9 is intended to be illustrative of means for producing any of these forms of current. The present application relates more particularly to an apparatus adapted to cause the constant removal of the brine around the electrode and the cooling of the brine within the tank, and may be used with any form of current desired.

Having thus described my invention, what I claim is:

1. In a preserving apparatus, the combination of a vessel adapted to contain the articles to be preserved and a fluid electrolyte, electrodes in the vessel, means for supplying an electric current thereto which passes through the articles and electrolyte, and means for forcing cold air through the fluid to perform the triple result of agitating it about the articles being preserved and cooling it and causing it to flow at the electrodes away from such articles.

2. In an apparatus for preserving, the combination of a vessel, electrodes therein, partitions between the electrodes and the intermediate portion of the vessel, there being openings across the partitions adjacent to their lower ends, and means for forcing air into the bottom of the vessel.

3. In an apparatus for preserving, the combination, of a vessel adapted to contain the articles to be preserved and a fluid preservative medium, electrodes in said medium, means for supplying an air blast to the fluid adjacent to the electrodes to cause said fluid to flow at such points away from the articles being preserved.

4. In an apparatus for preserving, the combination, of a vessel adapted to contain the articles to be preserved and a fluid preservative medium, electrodes in said medium, means for supplying an air blast to the fluid adjacent to the electrodes to cause said fluid to flow at such points away from the articles being preserved, and means for properly maintaining the level of the liquid in the tank by adding preservative medium thereto.

5. In an apparatus for preserving, the combination of a vessel, trays or racks within the vessel, electrodes in the vessel at the opposite ends of such trays or racks, partitions between the electrodes and the racks, and means for causing the fluid between the partitions and the ends of the vessel to flow outwardly.

6. In an apparatus for preserving, the combination of a vessel having a false bottom, openings through such bottom, means for forcing air into the space beneath the false bottom, which air passes upwardly through such false bottom, electrodes in the vessel, and means for supplying electric current thereto.

7. In an apparatus for preserving, the combination of a vessel having a bottom and a false bottom, openings through the false bottom, means for supplying air to the space between the bottoms, trays or racks carrying the articles to be preserved in the vessel above the false bottom, and means for passing a current of electricity through such articles and through the medium surrounding them.

8. In an apparatus for preserving, the combination of a vessel adapted to contain the articles to be preserved and a liquid preserving medium, electrodes in the vessel, means for supplying a current of electricity thereto which passes through the preserving medium, means for conducting away an overflow adjacent to the electrodes, partitions between the electrodes and the articles being preserved, and means for causing the electrolyte on the outer side of such partitions to flow outwardly.

9. In an apparatus for preserving, the combination of a vessel adapted to contain the articles to be preserved and a liquid preserving medium, electrodes in the vessel, means for supplying a current of electricity thereto which passes through the preserving medium, means for conducting away an overflow adjacent to the electrodes, a partition between the electrodes and the articles being preserved, means for causing the electrolyte on the outer side of such partitions to flow upwardly, a conduit for discharging fresh preservative liquid into the vessel to take the place of the overflow, and a float and valve controlled thereby for regulating such addition according to the level in the vessel.

10. In a preserving apparatus, the combination of a vessel adapted to contain the articles to be preserved and a liquid preserving electrolyte, electrodes in the vessel, means for confining a limited quantity of such electrolyte about the electrodes, and means for directing a blast of air through such limited quantity to divert it from the articles being preserved.

In testimony whereof, I hereunto affix my signature in the presence of two witnesses.

JOHN C. LINCOLN.

Witnesses:
F. B. WAGNER,
BRENNAN B. WEST.